United States Patent
Bennett et al.

(10) Patent No.: US 6,996,525 B2
(45) Date of Patent: Feb. 7, 2006

(54) SELECTING ONE OF MULTIPLE SPEECH RECOGNIZERS IN A SYSTEM BASED ON PERFORMANCE PREDECTIONS RESULTING FROM EXPERIENCE

(75) Inventors: Steven M. Bennett, Hillsboro, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 09/882,563

(22) Filed: Jun. 15, 2001

(65) Prior Publication Data

US 2002/0194000 A1 Dec. 19, 2002

(51) Int. Cl.
*G10L 15/00* (2006.01)

(52) U.S. Cl. .................... 704/231; 704/270.1; 704/251; 704/253; 704/256; 704/240

(58) Field of Classification Search ............... 704/231, 704/233, 235, 240, 232, 251, 253, 256, 270.1, 704/270, 255, 704; 382/138
See application file for complete search history.

(56) References Cited

U.S. PATENT DOCUMENTS

| 5,189,727 | A | * | 2/1993 | Guerreri ..................... 704/231 |
| 5,233,681 | A | * | 8/1993 | Bahl et al. .................. 704/251 |
| 5,613,036 | A | * | 3/1997 | Sukkar ....................... 704/256 |
| 5,638,487 | A | * | 6/1997 | Chigier ....................... 704/253 |
| 5,677,991 | A | * | 10/1997 | Hsu et al. ................... 704/255 |
| 5,712,957 | A | * | 1/1998 | Waibel et al. ............... 704/240 |
| 5,790,754 | A | * | 8/1998 | Mozer et al. ................ 704/232 |
| 5,855,000 | A | * | 12/1998 | Waibel et al. ............... 704/235 |
| 5,924,066 | A | * | 7/1999 | Kundu ........................ 704/232 |
| 5,960,394 | A | * | 9/1999 | Gould et al. ............. 704/270.1 |
| 5,970,446 | A | * | 10/1999 | Goldberg et al. ........... 704/233 |
| 6,021,387 | A | * | 2/2000 | Mozer et al. ................ 704/232 |
| 6,055,327 | A | * | 4/2000 | Aragon ....................... 382/138 |

OTHER PUBLICATIONS

Kenne et al ("Hybrid Language Models And Spontaneous Legal Discourse", Fourth International Conference on Spoken Language, Oct. 1996).*

Kenne et al ("Hybrid Language Models And Spontaneous Legal Discourse", Fourth International Conference on Spoken Language, Oct. 1996).*

Barry et al ("The Simultaneous Use Of Three Machine Speech Recognition Systems To Increase Recognition Accuracy", Proceedings of the IEEE 1994 National Aerospace and Electronics Conference, May 1994).*

Yashchin et al ("Performance Of Speech Recognition Devices: Evaluating Speech Produced Over The Telephone Network", International Conference on Acoustics, Speech, and Signal Processing, May 1989).*

Wang et al ("Towards Universal Speech Recognition", Fourth IEEE International Conference on Multimodal Interfaces, Oct. 2002).*

* cited by examiner

Primary Examiner—Vijay B. Chawan
(74) Attorney, Agent, or Firm—Joni D. Stutman-Horn

(57) ABSTRACT

A method for selecting a speech recognizer from a number of speech recognizers in a speech recognition system. The speech recognition system receives an audio stream from an application and derives enabling information. The speech recognition system then enables at least some of the speech recognizers and receives their results. It derives selection information and uses it to select the best speech recognizer and its results and returns those results back to the application.

18 Claims, 3 Drawing Sheets

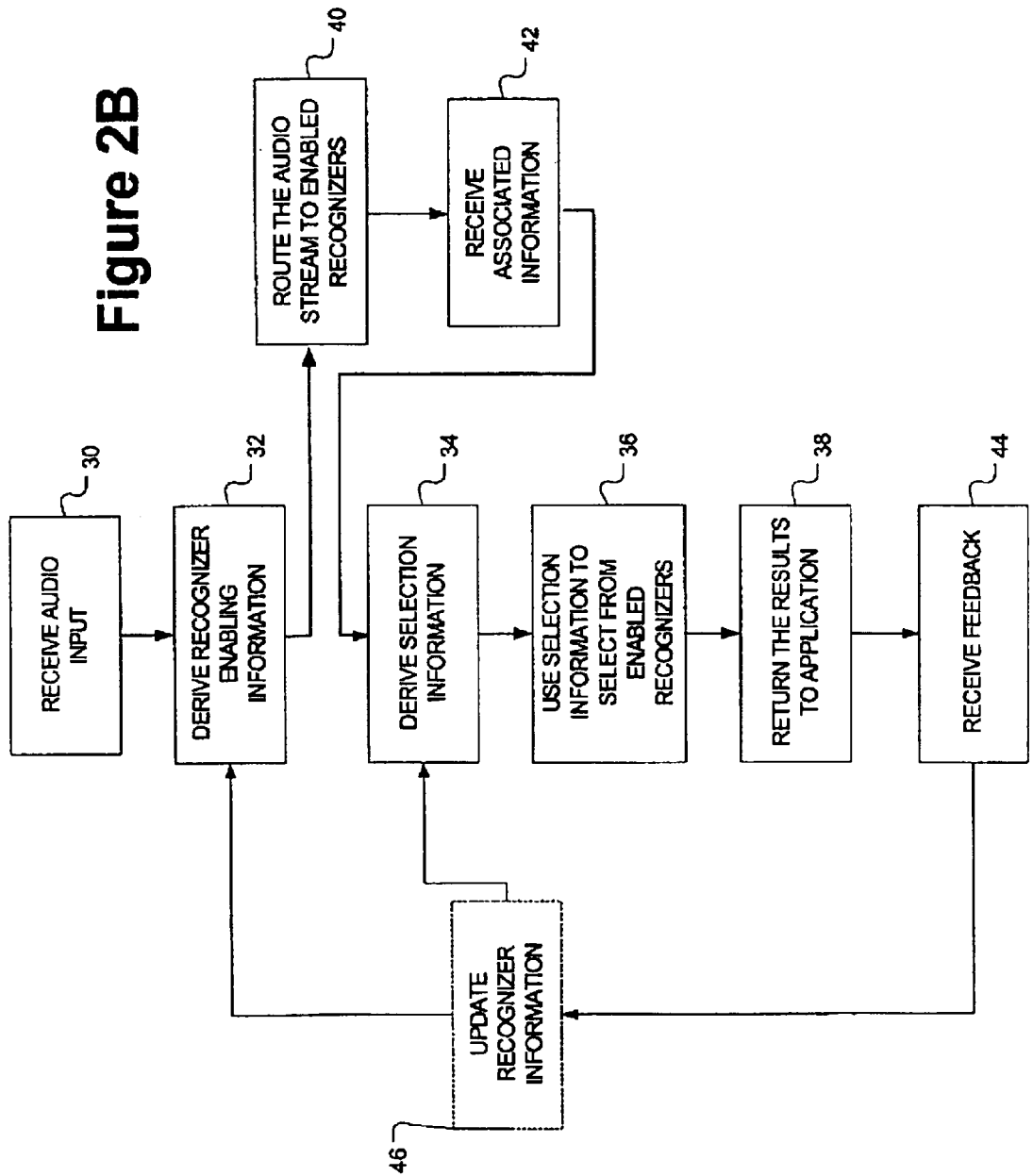

SELECTING ONE OF MULTIPLE SPEECH RECOGNIZERS IN A SYSTEM BASED ON PERFORMANCE PREDECTIONS RESULTING FROM EXPERIENCE

BACKGROUND

1. Field

This disclosure relates to speech recognition systems, more particularly to speech recognition systems using multiple speech recognizers with varying performance and operational characteristics.

2. Background

Speech recognition systems typically convert speech to text for dictation applications or to commands for command and control tasks. The speech is received through an incoming audio stream, converted and returned to the application as converted or recognized speech. The applications in use by the user generating the audio stream may include dictation systems, voice interfaces for menu driven applications, etc. The system may utilize cellular or landline phone systems, Voice-over-IP networks, multimedia computer systems, etc.

Speech recognition systems use modules referred to as speech recognizers, or recognizers, to perform the actual conversion. Performance in recognizers varies, even if recognizers are targeted at the same market. For example, a recognizer used in a system targeted to the dictation market from manufacturer A will perform differently than a recognizer targeted to the same market from manufacturer B. Additionally, 2 recognizers from a single manufacturer targeted at similar markets may perform differently. This occurs because different algorithms are used to perform the recognition and different speech models are used to drive the recognizers. Speech models may differ due to differing content and speakers used to generate the model, as well as the representation of this data.

Though current applications utilize only a single recognizer, more robust speech recognition systems may utilize several different recognizers. This allows the system to have different recognizers available for different tasks and users. However, selecting the optimal speech recognizer for a given situation is problematic, as is a way to track and update performance records of the various recognizers in different situations, which allows better optimization.

BRIEF DESCRIPTION OF THE DRAWINGS

The invention may be best understood by reading the disclosure with reference to the drawings, wherein:

FIGS. 2A and 2B show embodiments of a method of selecting a speech recognizer using performance prediction, in accordance with the invention.

DETAILED DESCRIPTION OF THE EMBODIMENTS

Figure 1:
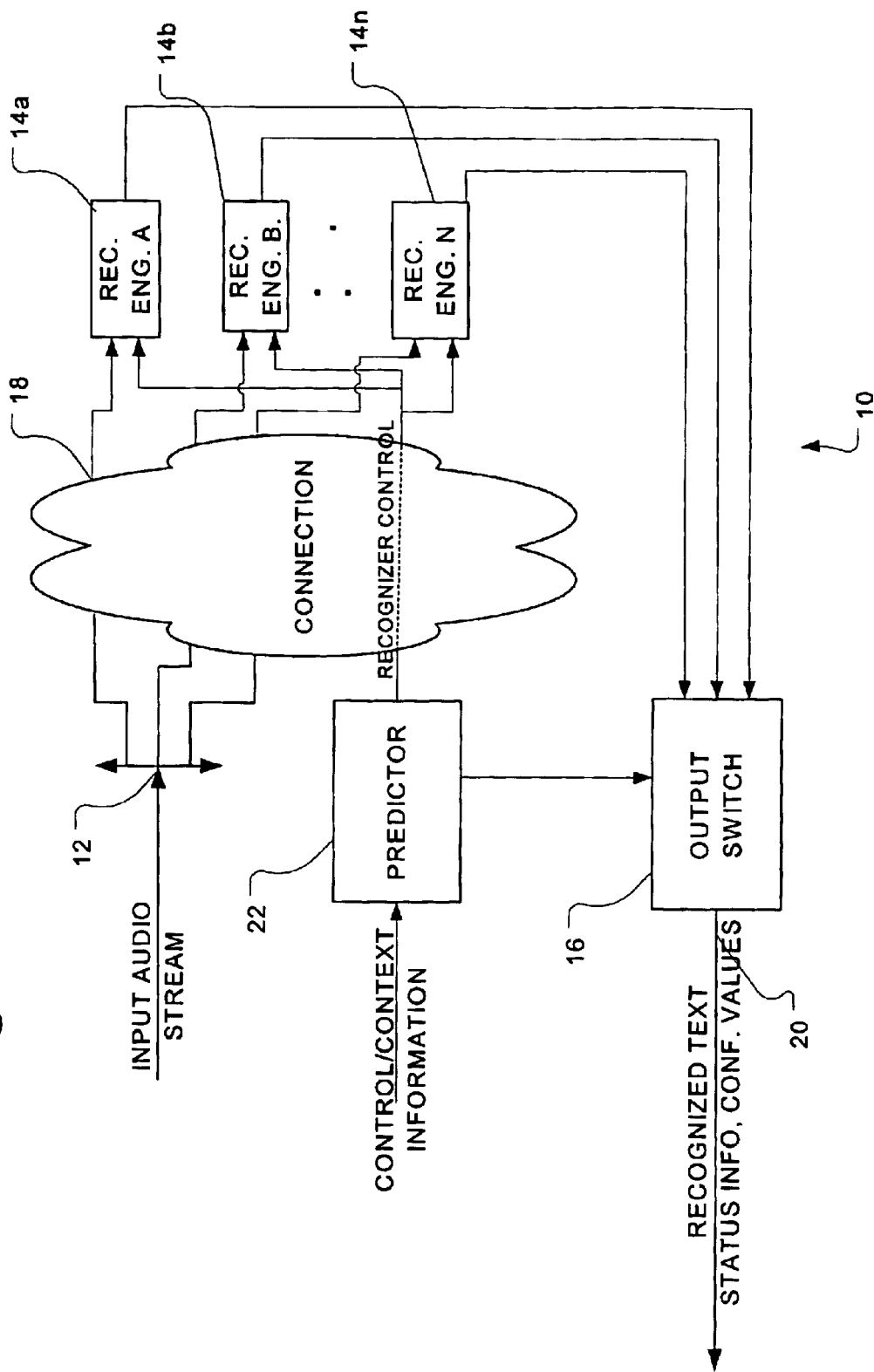
FIG. 1 shows one embodiment of a speech recognition system having a predictor module, in accordance with the invention.

FIG. 1 shows one embodiment of a speech recognition system 10 having a predictor and multiple recognizers. The speech recognition system receives an input audio stream through a port from some user of a speech recognition application at 12. The input audio stream is connected through some sort of connection 18 to the speech recognizers. The connection may be wireless, such as a cell phone connection, a local area network, or through the circuitry of a personal computer, as examples.

The speech recognizers may be partitioned across a network as in a distributed speech recognition system. In this case, the recognizers 14a–14n may process raw audio data or a more compact form generated by the front-end speech recognition processes that reside across the network 18. In the following discussions, we refer to the stream of data that the speech recognizers process as the "input stream" or "input audio stream" regardless if it is raw audio data or an intermediate form that may be generated by a distributed speech recognizer or any other form of compression. The invention is in no way limited by the specific architecture of the recognizers.

The recognizers, 14a–14n, receive the input stream. It must be noted that although it appears that there are 14 recognizers a–n, the use of the letter n is in the mathematical sense, where n is the number of recognizers decided upon by the system designer. In some embodiments the predictor 22 may control the routing of the input stream to the recognizers. The recognizers receiving the input stream and converting it will be referred to as the enabled recognizers. The enabling of the recognizers by the predictor will be discussed in more detail below.

The enabled recognizers perform the speech recognition tasks. The output of the enabled recognizers would then be sent to an output switch 16. The predictor then selects a set of results 20 from the results presented to the output switch 16. The basis of that selection is discussed in more detail below.

Figure 2A:
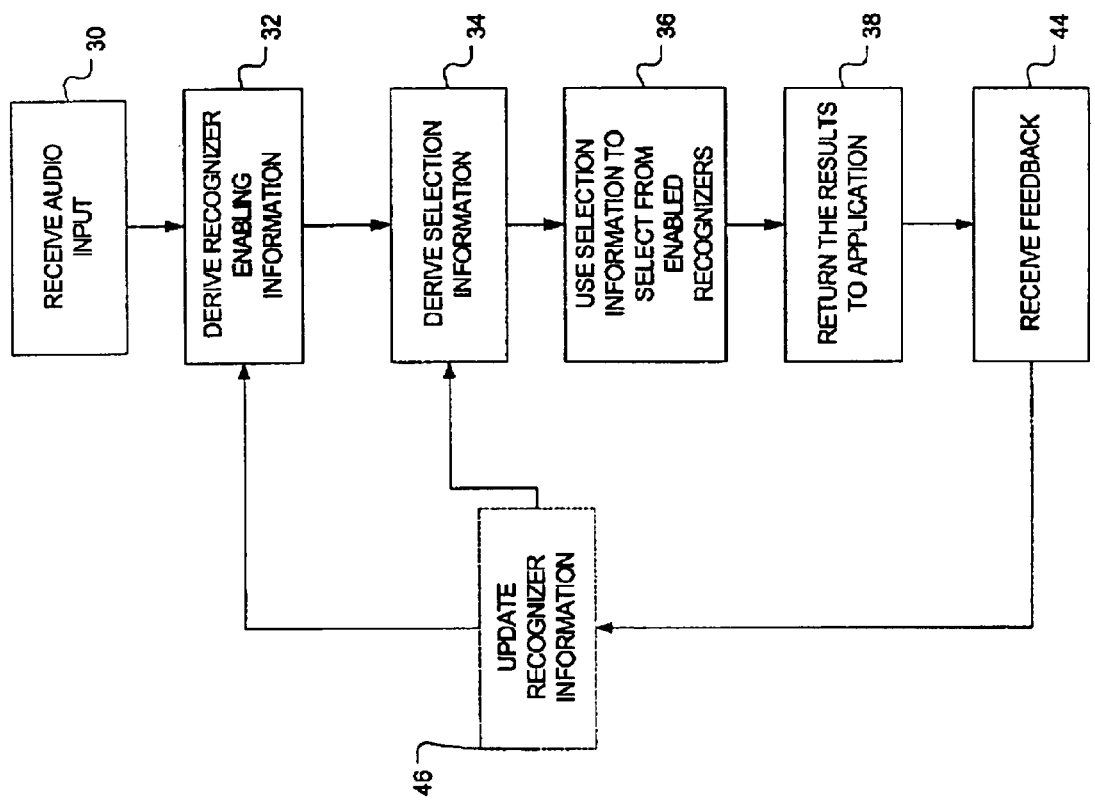

One embodiment of performing the selection of the appropriate recognizer is shown in FIG. 2A. As discussed above with regard to FIG. 1, an input stream is received at 30. The input stream carries the speech input, as well other sounds and audio cues that may be used in deriving information pertinent to the speech recognition task.

For example, at 32, the input stream may be analyzed to determine characteristics of the communication channel. In some systems, analyzers exist that allow the system to determine the audio characteristics of the channel, for example, determining if the cellular or landline communication networks are in use. Other information may also be derived, including background noise and signal strength among others. Additionally, this analysis may determine characteristics of the communication device, for example determining if a speaker-phone or a wireless handset are in use. This analysis may occur as part of deriving enabling information for the recognizers. Network-based information services such as CallerID in conjunction with a local or network-based database mapping calling number to channel and device characteristics may be utilized for similar effect.

Enabling information, as used here, is information used to select the recognizers that process the input stream. For example, the system may have some recognizers that are better for cell phone audio streams than other recognizers. Other characteristics may also determine the recognizers that would be enabled for a particular input stream. Note that in some systems, the input stream may be routed to all recognizers even if they are not actively processing the input. This may occur, for example, if the recognizers are on a shared bus or communication network. All of the recognizers may be enabled, or only a few may be enabled, as will be discussed later. In some implementations, all recognizers may always be enabled at all times and in all situations.

For example, the characteristics of the device used to generate the audio stream or the communication channel in use may indicate a particular recognizer or recognizer type. The device could be a cell phone, even further defined as a particular brand of cell phone, a particular brand or type of landline phone, such as cordless, speakerphone or 'traditional' handset phone. Other examples exist including microphones and personal computers used in conjunction with phone lines or even over data networks, such as Voice-Over-Internet Protocol (VoIP phones). These are just examples of variations of the devices, and are not intended to limit scope of the invention in any way.

A more complex characteristic of the incoming stream is contextual information. Contextual information is that information related to the environment around the input stream, including characteristics of the user and information derived from the call using network services such as CallerID. This information may be obtained dynamically or may be predetermined.

As an example of dynamic information, the CallerID of a phone call that will have speech recognition performed on it may identify the call as international. Certain assumptions may be made about the quality of the audio stream based upon the identification of the call as international. An example of the predetermined information may be a user profile stored by the provider of the speech recognition application. The user may have a profile connected to their user identifier that identifies the user as an American male from the Deep South. This may indicate that recognizers that have good performance for American men with southern accents be enabled.

In one embodiment of the invention, once the enabling information is received and those recognizers to receive the stream are enabled, the selection information is derived at 34. In an alternative embodiment, to be discussed later, the performance predictors or indicators may be updated and analyzed prior to the deriving the selection information. Deriving the enabling information allows the system to select the recognizers that will process the input stream. Deriving the selection information allows the system to select the best results from the recognizers.

The system may be configured so that it enables only a single recognizer determined to be the best for any given situation. In this case, the recognizers will return only one result, the results from that enabled recognizer. The system has derived enabling information; in this case, deriving selection information is trivial. Alternatively, the system may enable all recognizers and derive only the selection information, avoiding the enabling process and only using the predictor to select the results predicted to be the best. Finally, the system may use the predictor to do both the enabling and the selecting processes. The predictor would both enable some or all recognizers and the select the best results. In any of the above cases, the information used for either enabling, selecting or both may comprise the same general types of information discussed above.

In one embodiment, recognizers return their converted speech accompanied by one or more values that indicates the confidence the recognizer has in a particular result. We call these values individual-result confidence values. The predictor mechanism determines, for each recognizer in the system and for each situation, a recognizer-based confidence value. This recognizer-based confidence value is the predictor's estimation of the accuracy of each recognizer in a particular situation. The predictor tracks performance of individual recognizers under a variety of conditions to determine recognizer-based confidence values. This includes correlating performance to channel and device characteristics, dialog state, user information and other contextual information. This allows the predictor to estimate, for example, the performance of recognizer A for user B communicating using a speakerphone.

The selection information will include at least one of the sets of information identified above: channel characteristics, device characteristics, user information, contextual information, dialog state, individual-result confidence values or the performance history of the particular recognizer. These sets of information will be referred to as performance-related information. Performance-related information exists in the predictor prior to receiving the converted streams from the recognizers or is derived from the input stream. This differs from the prior art, where the selection information is based only upon the converted streams and the active grammar. This prior art does not utilize performance-related information.

One element of performance-related information is a quantitative analysis of the costs of using a particular recognizer, in either financial or computational terms. Some manufacturers charge a licensing fee per use of their recognizers. This information may be factored into the performance related information to identify recognizers that may be too costly to be used in a particular context. Similarly, some recognizers use more computational resources than others. This factor may allow the system to select the best recognizer for the costs associated, either in licensing fees or load on the system.

The predictor selects the 'best' results based on the information available to it and tracks performance over time to improve the enabling and selection process. This prediction is important both for providing good system-level recognition accuracy and for optimizing resource usage by enabling only recognizers that may provide useful results. Information regarding the correctness of the recognition process is necessary to tune the predictor over time. We call this information "feedback" in the discussions that follow. Feedback may be obtained directly through interaction with the user or by a variety of indirect means. We discuss this below.

The predictor gathers all information available and selects the results from the best recognizer, selecting a particular recognizer at 36. The information made available to the predictor in a particular embodiment will determine how the prediction is made in that embodiment. Several different kinds of information may be made available to the predictor for selection of a given recognizer. For example, the predictor may use recognizer-based confidence, analysis of the input stream, contextual information, and dialog states, as examples. Additionally, the predictor may store performance data derived either on-line or off-line to aid in prediction.

The measure of confidence may vary from recognizer to recognizer, so individual-result confidence values may have to be normalized to the same measurement scale. For example, one recognizer may provide a percentage out of 100% that indicates the recognizer's confidence that a particular result is accurate. Another may provide a rating on a scale from 1 to 10. These would have to be converted to the same measure before they could be compared.

The individual-result confidence values may be used in a simple voting mechanism where several recognizers return a particular result. For example, the result may be "The quick brown fox." If 6 of the available recognizers return that particular result, that result will be given a higher confidence value than results that were returned only by one recognizer. This information can be leveraged with feedback and performance history, as will be discussed further. Note that individual-result confidence values are not necessary to implement a voting mechanism, nor are they required for implementation of these feedback and performance tracking mechanisms.

In one embodiment of the invention, the flow as shown in FIG. 2A is modified to include 40 and 42, as shown in FIG. 2B. The input stream is routed to the enabled recognizers in 40. The enabled recognizer provides results and associated recognizer information that may include individual result confidence values, for example, to the predictor at 42. The predictor then uses the recognizer information as part of the selection information in 34.

As mentioned above, the analysis of the input stream may identify certain channel or device characteristics that can be used in the selection information. Certain recognizers may be provided by a manufacturer and targeted for a particular channel or device. This information can be used to weight the information received from recognizer, including individual result confidence values.

Similarly, contextual information, as discussed, above can also be used to predict the best recognizer. Contextual information may include gender, age, ethnicity, whether the speaker speaks the language of the recognizers as a first language, among other personal information about the user. Also, the channel and device characteristics may be included in the contextual information.

The channel and device characteristics were discussed above as part of an analysis of the input stream. It must be noted that even systems that do not perform this signal-processing analysis may be able to use device and channel characteristics that are known or implied from the context of the call, rather than from an analysis of the input stream. For example, the CallerID, along with local or network based databases associating calling number with device characteristics, may identify the incoming call as being from a cellular phone. While all of these different sources of information may be used together, they may also be used alone, and systems not performing input stream analysis may still have channel and device characteristics available as part of the selection information.

Another source of information that can be factored into the selection information is the dialog state of the interaction between the user and the application requesting speech recognition. The application knows the state of the dialog and can provide that information to the speech recognition system. The speech recognition system can use that information to predict the best recognizer. For example, certain recognizers may be better for control keywords. A user calls into the system and navigates the menus using control keywords and then starts a dictation process. The speech recognition system may have knowledge about which recognizers are optimized for the control keywords and which are best for the dictation. It can then use this knowledge in the selection information. Additionally, a variety of recognizers optimized for dictation may be available, for example. However, they perform differently in different domains, with one being optimized for legal use, one optimized for medical use, and a third for general use for example. If the system knows that the user is dictating a legal memo based on the current state of the dialog, it may use the legal-dictation-optimized recognizer. Alternatively, the dialog state may indicate that the more general dictation recognizer is more appropriate. This knowledge may be used in the selection and enabling processes.

In the examples above, the speech recognition system may change recognizers for a given user. The streams entering the system initially are control keyword audio streams. At some point, the input streams may change to dictation audio streams. At that point, the system may select a different recognizer. This system is dynamic and flexible.

For example, assume there are two recognizers. Recognizer A does speaker and channel adaptation and adapts slowly but ends up being very accurate if it has enough time to adapt. Recognizer B performs moderately well but requires no adaptation time. Initially, the system chooses B, but allows both to process the audio. This allows A to adapt. Eventually, Recognizer A has adapted sufficiently to cause the system to expect that it will out perform the Recognizer B. The recognizers may then provide this information to the predictor. At this point, the predictor will use results from Recognizer A. With regard to enabling the recognizers, if applicable, Recognizer A is being enabled based upon its expected future performance, rather than its current performance.

Generally, the selection information with regard to Recognizer A will be updated, and the updated selection information will cause a different recognizer to be selected than was used in previous interactions. An interaction could be an utterance within a session. For example, the user makes several utterances separated by silence. For the first few utterances, the system may use Recognizer B, as Recognizer A adapts. For the remaining utterances, the system may switch to Recognizer A, not the recognizer used for the previous utterances. Alternatively, an interaction could be an entire session where the user enters a speech recognition process and then ends it, such as dialing into a telephone-based system, and ending by hanging up. In this example, Recognizer B may be used for a first few sessions with a particular user, while Recognizer A is adapting, and then the system may select Recognizer A after it has adapted.

Up to this point in the process, the knowledge of the recognizers is preexisting knowledge, probably provided when the recognizer was initially received or installed. The predictor uses all of the information available to predict the best results by identifying the best recognizer for a given situation. These results are then returned to the application. All of the above measures and information can be updated dynamically using feedback mechanisms.

The predictor may utilize data on past performance to perform the enabling and selection processes. As discussed above, we call this data "feedback". Feedback may be explicit or implicit as is demonstrated below. These feedback mechanisms are only intended as examples and are not intended to limit scope of the invention in any way.

Referring to both FIGS. 2A and 2B, after the results are returned to the application in block 38, feedback may be generated at 44, as an option. This feedback may then be used to update information about the recognizers at 46, such as their performance with a given characteristics in the contextual information, a weighting that is applied to their individual-result confidence values, their optimization for various channels and devices, among many others. This is optional. This updated information may also be used when deriving the enabling information 32 or the selection information 34, or both. The feedback may be generated in several ways, and at several different times. For example, feedback generated off-line will not occur at the place in the process shown here, but much later. In some systems, the user may provide the feedback, directly indicating the recognition accuracy. This may occur, for example, in dictation applications. The predictor may track the user's corrections and use that information to tune the prediction process. In many applications, this is too cumbersome to be practical. A variety of indirect measurement methods are discussed below.

In some speech recognition systems, the feedback may be from human evaluation. After results are returned from the enabled recognizers, they may be stored with the original audio stream for off-line evaluation. A human could listen to the audio stream and then review the results provided and make indications as to which enabled recognizers were correct. This evaluation would then be coded and stored for later access by the predictor.

Another possibility for feedback generation is the voting based estimation mentioned above. Similar to the pure voting scheme used to select a particular result, measurements for each recognizer may be maintained. If the recognizer was one that returned the results with the highest number of votes, a recognizer-based confidence value may be raised.

The voting scheme could also be leveraged to weight results returned from various recognizers. For example, a recognizer with a recognizer-based confidence value of 90% returns a result with an associated individual result confidence value of 95%. The weighted individual-result confidence value for that result would then be (0.90)*(0.95) or 0.86. Another recognizer with a recognizer-based confidence value of 99% may return a particular result with an associated individual result confidence value of 90%. The weighted individual-result confidence value for that result is (0.99)*(0.90) or 89%. In this manner, even though the first recognizer returned an individual-result confidence value for the results higher than the second recognizer, the second recognizer's results would 'win.' This is because the second recognizer has performed correctly in the past 99% of the time.

Prior speech recognition systems that have utilized multiple recognizers have not attempted to track performance information over time. Rather, they implement a simple voting scheme that evaluates each utterance independent of previous recognizer performance. This is discussed in Barry, T.; et al., "The simultaneous use of three machine speech recognition systems to increase recognition accuracy," Aerospace and Electronics Conference, 1994. NAECON 1994, Proceedings of the IEEE 1994 National Page(s): 667–671 vol. 2. The invention disclosed here uses performance histories and extensive contextual information to make the multiple speech recognizer system more robust and better performing.

Implementation of the invention is left to the system designer. The speech recognition system of FIG. 1 may be built from scratch to include the predictor. Alternatively, the predictor may be included in existing speech recognition systems as an upgrade. While it is possible that the predictor may be a dedicated processor or application-specific integrated circuit (ASIC), it may also be embodied in software loaded into the speech recognition system. In this instance, the software would perform the steps of the invention.

The software may be loaded into a digital signal or general-purpose processor via some form of computer readable medium, or as an image file into a digital signal processor. In either example, as well as others, the invention would be contained on an article including machinereadable code, where execution of that code would implement the methods of the invention.

Thus, although there has been described to this point a particular embodiment for a method and apparatus for selecting a best speech recognizer from multiple speech recognizers, it is not intended that such specific references be considered as limitations upon the scope of this invention except in-so-far as set forth in the following claims.

What is claimed is:

1. A method for selecting a recognizer from a number of recognizers, the method comprising:

a) receiving an input stream;

b) deriving selection information, wherein the selection information includes performance-related information;

c) deriving enabling information, and using the enabling information to enable at least one selected recognizer to process the input stream;

d) using the selection information to select results from at least one enabled recognizer, and e) returning the results to an application.

2. The method of claim 1, wherein the enabling information comprises at least one type of information from the group comprised of:

channel characteristics, device characteristics, user information, contextual information, dialog state, recognizer costs and performance history.

3. The method of claim 1, wherein the enabling information comprises recognizer costs.

4. The method as recited in claim 1, wherein the method further comprises receiving feedback and including the feedback in the selection information.

5. The method as recited in claim 1, wherein the derived enabling information including performance-related information comprises performance tracking using enabling information to select at least one recognizer.

6. The method as recited in claim 1, wherein the selecting results front one of the at least on enabled recognizers is based on selection information comprising performance predictors.

7. The method as recited in claim 6, wherein the performance predictors are selected from a group or predictors comprising channel characteristics, device characteristics, user information, contextual information, dialog state; and individual-results confidence.

8. A method for selecting a recognizer from a number of recognizers, the method comprising a) receiving an input stream;

b) deriving selection information, wherein the selection information includes performance-related information;

c) deriving enabling information, and using the enabling information to enable at least one selected recognizer to process the input stream;

d) using the selection information to select results from at least one enabled recognizer, wherein the enabling information is used to enable a recognizer based upon its expected future performance; and e) returning the results to in application.

9. An article containing machine-readable code that, when executed, causes the machine to a) receive an input stream;

b) derive enabling information, wherein the enabling information includes performance-related information;

c) use the enabling information to select an enabled recognizer; and d) return results from the enabled recognizer to an application.

10. The article of claim 9, the code causing the machine to derive enabling information includes code, that when executed, causes the machine to analyze the input stream for channel characteristics.

11. The article of claim 9, the code causing the machine to derive enabling information includes code, that when executed, causes the machine to receive contextual information associated with the input stream.

12. The method of claim 11, wherein contextual information comprises information from at least one item of information derived from the set of information comprising information related to the environment around the input stream, characteristics of a user generating die input stream, information derived from a call using network services, gender, age, ethnicity, information relating to the user's first (native) language, personal information about the user, channel characteristics and device characteristics.

13. The method as recited in claim 12, wherein the contextual information is obtained dynamically.

14. The method as recited in claim 12, wherein the contextual information is predetermined.

15. The article of claim 9, the code including code, that when executed, causes the machine to receive feedback and include the feedback in the selection information.

16. The article as recited in claim 9, wherein the machine-readable code further causes the machine to receive feedback and includes the feedback in selection information.

17. The article as recited in claim 9, wherein the derived enabling information includes performance-related information comprising performance tracking, wherein the performance-tracking uses enabling formation to select at least one recognizer.

18. The article as recited in claim 9, wherein selecting results from one of the at least on enabled recognizers is based on selection information comprising performance predictors.

* * * * *

UNITED STATES PATENT AND TRADEMARK OFFICE
CERTIFICATE OF CORRECTION

PATENT NO. : 6,996,525 B2  Page 1 of 1
APPLICATION NO. : 09/882563
DATED : February 7, 2006
INVENTOR(S) : Bennett et al.

It is certified that error appears in the above-identified patent and that said Letters Patent is hereby corrected as shown below:

Item (54), On the Title Page at line 3 delete "PREDECTIONS" and insert --PREDICTIONS--.

In column 8, at line 35, delete "front" and insert --from--.

In column 8, at line 44, after "comprising" insert --:--.

Signed and Sealed this

Sixth Day of November, 2007

JON W. DUDAS
*Director of the United States Patent and Trademark Office*